United States Patent [19]

Raguet

[11] Patent Number: 4,784,401
[45] Date of Patent: Nov. 15, 1988

[54] COLLAPSIBLE CADDIE CART

[76] Inventor: Francois-Xavier Raguet, Hautes-Rivières, 08800 Montherme, France

[21] Appl. No.: 69,299

[22] Filed: Jul. 2, 1987

[30] Foreign Application Priority Data

Jul. 11, 1986 [FR] France ................. 86 10169

[51] Int. Cl.⁴ .............................................. B62B 1/04
[52] U.S. Cl. ...................................... 280/40; 280/38; 280/652; 280/DIG. 6
[58] Field of Search .................... 280/DIG. 6, 652, 38, 280/645, 646, 39, 40

[56] References Cited

U.S. PATENT DOCUMENTS

| 2,626,814 | 1/1953 | Chamberlin | 280/DIG. 6 |
| 2,714,012 | 7/1955 | Berger | 280/DIG. 6 |
| 2,806,709 | 9/1957 | Watson | 280/DIG. 6 |
| 2,914,336 | 11/1959 | Hibben, Jr. et al. | 280/DIG. 6 |
| 3,043,602 | 7/1962 | Meiklejohn | 280/38 |
| 4,062,564 | 12/1977 | Schimmeyer | 280/DIG. 6 |
| 4,262,928 | 4/1981 | Leitzel | 280/DIG. 6 |
| 4,657,100 | 4/1987 | Lewis | 280/38 |

FOREIGN PATENT DOCUMENTS

| 513868 | 1/1951 | Canada | 280/DIG. 6 |
| 9333 | 4/1980 | European Pat. Off. | |
| 87200 | 8/1983 | European Pat. Off. | |
| 2491420 | 4/1982 | France | |
| 2575430 | 7/1986 | France | |

Primary Examiner—David M. Mitchell
Assistant Examiner—Eric D. Culbreth
Attorney, Agent, or Firm—Mason, Kolehmainen, Rathburn & Wyss

[57] ABSTRACT

The invention relates to a collapsible cart capable of occupying a compact collapsed position and a deployed in-use position. In accordance with the invention, the collapsible cart comprises two half-risers (1a, 1b) hinged to a hinge piece (2) to form a rectilinear riser (1) when in the deployed position, two side legs (3a, 3b) hinged to the same hinge piece (2) and fitted with respective wheels (4a, 4b), and links (5a & 5b, 6a & 6b) connecting each of said half-risers and said side legs to a central post (7). The cart is particularly suited to carrying a golf bag and clubs.

13 Claims, 3 Drawing Sheets

FIG_1

FIG_2

COLLAPSIBLE CADDIE CART

The present invention relates to a collapsible cart, in particular a caddie cart intended for carrying a golf bag and clubs. However, the invention is not limited to carrying objects of this type, and it may be applied, for example, to carrying windsurfers.

BACKGROUND OF THE INVENTION

When such objects are carried by means of non-collapsible carts, the carts suffer from the major drawback of being difficult to carry in a private vehicle simultaneously with the objects with which they are associated.

That is why various carts have been proposed that are collapsible so that their bulk is greatly reduced while they themselves are being carried or stored prior to being used.

French patent document FR-A-2 575 430 describes a one-person collapsible cart intended, in particular, for carrying golf clubs. This cart is suitable for taking up a first, or collapsed portion in which it occupies little space laterally, and a second, or deployed working position in which it is sufficiently rigid to carry golf clubs. More specifically, this cart comprises a frame forming a central body with a bagcarrying strut and two half-axles hinged to the base thereof. In the deployed position, the two half-axles and the strut occupy the same horizontal plane with the central body being perpendicular to said plane. The cart is collapsed by means of a cursor sliding over the central body, said cursor being connected to the half-axles and to the strut by means of links: it is therefore necessary to begin by folding each of the wheels beneath the associated half-axle before collapsing the moving members onto the central body.

Collapsible carts of this type suffer from numerous drawbacks. Firstly, the necessity of having a cursor present means that there is a risk of it jamming and may be even preventing the cart from being collapsed normally. Further, the shafts of the wheels are hinged to the half-axles so that the wheels can be retracted, in order to reduce lateral bulk as much as possible. In addition to complicating operations, these hinges seriously weaken the rigidity of the cart in operation and therefore require additional locking means to be provided. Finally, the disposition of the cart in its deployed position gives rise firstly to extremely little ground clearance (about one wheel radius) which is a hindrance for use on rough ground, and secondly a very low position for the center of gravity which is relatively far away from the bag being carried, which is bad or equilibrium and for user comfort.

French patent document No. FR-A-2 491 420 describes another type of one-person collapsible cart. This cart comprises a frame in the form of a central riser extending generally vertically and having at least two, and preferably three legs mounted thereon suitable for folding against the frame and for being deployed radially: each of these legs is hinged at one end to a moving support slidably mounted on the frame and is also hinged via a link to the base of the frame. In addition, such a cart includes a lever which is hinged to the frame near the top thereof and which acts via at least one connecting rod to cause the moving support to slide so as to move the legs from their folded position to their deployed position, and vice versa.

Collapsible carts of the type described in FR-A-2 491 420 suffer from various drawbacks due specifically to their design, in particular they include a large number of relatively movable parts under the control of a single part, and this always leads to operating difficulties due to various hinges seizing. Further, the longitudinal extent of the cart when in the collapsed position remains relatively long.

Another type of collapsible one-person cart has also been proposed in which the central riser is partially telescopic, as described in European patent document EP-A-0 009 333.

This cart comprises a rigid central riser fitted with conventional means for fixing a golf bag and having two side legs hinged thereto. An extension of the central riser is slidably mounted therein and serves as a mounting for links connecting said extension to the side legs and connecting said side legs to each other: the cart is therefore collapsed by pushing home the telescopic extension like a piston rod, thereby returning the two side legs against the central riser.

The drawbacks mentioned above are present here also, due to the complexity of the structure, the risk of jamming during collapsing, and the relatively large residual bulk, both longitudinally and laterally.

The state of the art is finally illustrated by U.S. Pat. No. 2 714 012 and European patent No. 0 087 200 which describe collapsible carts.

The aim of the present invention is to provide a collapsible cart, intended more particularly for carrying golf clubs, which is capable of being easily operated over a long period of time while being simple in structure and relatively competitive in price, and without suffering from the above-mentioned drawbacks.

Another aim of the present invention is to provide a cart which is easy to pull in its deployed position and easy to carry in its collapsed position, in which position the cart is highly compact and sufficiently light to be easily carried by hand by a user.

SUMMARY OF THE INVENTION

These aims, together with others which appear below, are achieved by means of a collapsible cart intended in particular for carrying a golf bag and clubs, the cart being capable of taking up a first or collapsed position in which it is compact, and a second or deployed in-service position, the cart being characterized by the fact that comprises:

two half-risers each hinged at one end to a hinge piece such that in the deployed position said two half-risers are substantially in alignment to constitute a central riser provided with fixing means known per se, with one of said half-risers forming a strut whose free end may stand on the ground;

two side legs each hinged at one end to said hinge piece and each having its other or free end provided with running means such that in the deployed position said side legs slope obliquely as does the central riser, and the free ends of the strut and of said side legs form a triangle on the ground; and a set of links connecting each half-riser and each side leg to a central interconnecting post such that in the collapsed position said side legs and said half-risers are substantially parallel to one another and all of them are situated on the same side of said hinge piece.

Preferably, the collapsible cart includes locking means for locking together the central riser half-risers, said locking means being mounted on the hinge piece; in particular said locking means are essentially constituted by a pressure plate capable of rotating about a clamping screw so as to take up a first position corresponding to the collapsed position of the cart in which said pressure plate rests entirely against the hinge piece in order to leave the half-risers free to pivot, and a second position corresponding to the deployed position of the cart in which said pressure plate comes into contact with the ends of the two half-risers of the central riser where they are hinged to said hinge piece.

Advantageously, each of the side legs is constituted by a pair of bars disposed one above the other, each bottom bar being connected to the central interconnecting post by an associated link; in particular, the pair of bars of each side leg is hinged at one end to the hinge piece and at the other end to a support bracket associated with the shaft of the running means in such a manner as to ensure that the shafts of said running means remain in the same direction.

Preferably, the central interconnecting post is substantially vertical when the cart is in the collapsed position. In an advantageous embodiment, the links hinged to the side legs are connected to the top of the central interconnecting post so as to be substantially in alignment with each other in the deployed position, and the links hinged to the half-risers of the central riser are hinged to the base of the central interconnecting post and are at an acute angle to each other.

Advantageously, the free end of the half-riser of the central riser which does not constitute the strut, is hinged to a rod fitted with a handle; in particular, the rod fitted with a handle is hinged by means of a knuckle joint including locking means for any relative angular position between said rod and the associated half-riser. It is also advantageous for the half-risers to be of such a length that, when in the collapsed position, their free ends are level with the edges of the wheels, thereby enabling the cart to stand securely in said position.

Preferably, the collapsible cart further includes grasping means for facilitating handling said cart when in the collapsed position; in particular the grasping means is essentially constituted by a handle-forming flexible strap having each of its ends fixed to a corresponding one of the half-risers of the central riser.

BRIEF DESCRIPTION OF THE DRAWINGS

An embodiment of the invention is described by way of example with reference to the accompanying drawings, in which.

DESCRIPTION OF PREFERRED EMBODIMENT

Figure 1:
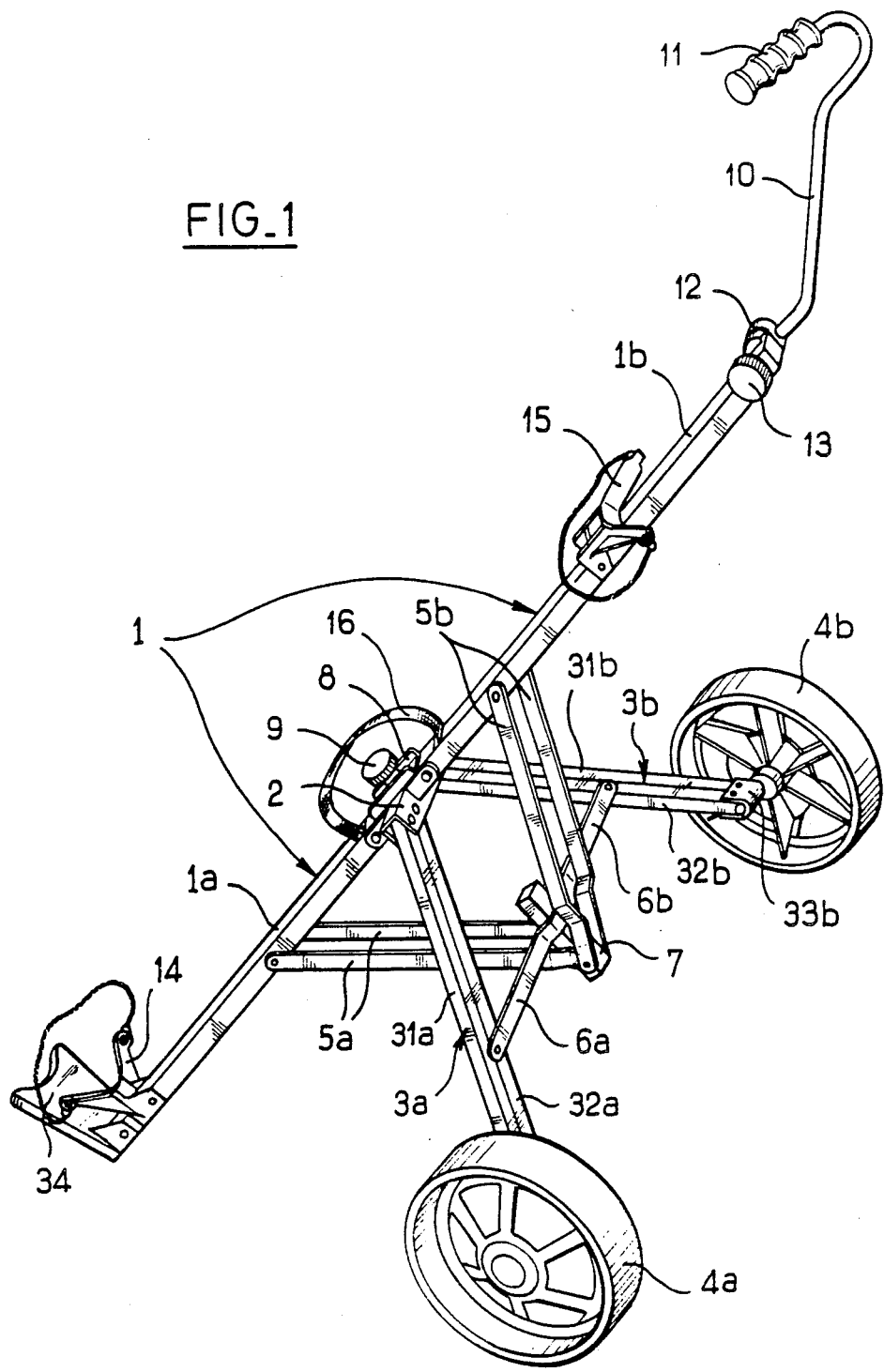
FIG. 1 is a perspective view of a cart in accordance with the present invention shown in its deployed position.

As can be seen in the figures, a collapsible carrier device such as a cart as defined above comprises two half-risers 1a and 1b each hinged at one of its ends to a hinge piece 2 such that in the deployed position (FIG. 1) the two half-risers 1a and 1b are substantially aligned with each other, thus constituting a sloping central riser 1. One of these two half-risers, the half-riser 1a in the present embodiment, constitutes a support strut whose free end may be stood on the ground.

The cart also includes two side legs 3a and 3b which slope obliquely when the cart is in the deployed position. One end of each of the side legs is hinged to the above-mentioned hinge piece 2, the other end of each leg is fitted with a respective wheel 4a or 4b.

The free ends of the half-riser 1a and of the side legs 3a and 3b (which are the ends fitted with the wheels 4a and 4b) form a triangle on the ground when the cart is in its deployed position.

In accordance with the present invention, this cart also includes a set of links 5a & 5b and 6a & 6b, each of which connects a corresponding half-riser or sloping leg to a central interconnecting post 7.

In order to lock the cart in its deployed position as shown in FIG. 1, the cart includes locking means constituted in this case by a pressure plate 8 capable of rotating about a clamping screw 9 mounted on the hinge piece 2.

When the cart is in the deployed position, the plate 8 presses directly against the two ends of the half-risers 1a and 1b which are hinged to the hinge piece 2. As explained below, the moving pressure plate 8 can occupy a second position, after rotating through about 90°, in which it rests entirely against the hinge piece 2, thereby releasing the hinges of the half-risers 1a and 1b.

At the free end of the half-riser 1b, i.e. the half-riser which does not constitute the supporting strut, is hinged to a rod 10 having a handle 11. The rod 10 is hinged, for example, by means of a knuckle joint 12 to the half-riser 1b. In this embodiment, the knuckle joint 12 comprises two cylindrical discs: One 12a of the cylindrical discs is fixed to the half-riser 1b; while the other cylindrical discs 12b is fixed to the rod 10. The facing portions of these cylindrical discs 12a and 12b are preferably notched circumferentially so that they can prevented from rotating by a clamping knob 13, thereby enabling the rod 10 to be inclined relative to the central riser 1 at any angle desired by the user.

At least two-bag carrying brackets 14 and 15 of conventional design are mounted on the central riser 1 enabling a golf bag to be fixed thereto, for example in conjunction with a foot plate 34 which is pivotally mounted to the half-riser 1a below the bottom bracket 14.

When the cart in accordance with the present invention is in its deployed position as shown in FIG. 1, the two links 6a and 6b which are hinged to the side legs 3a and 3b are connected to the top of the central interconnecting post 7 which is then substantially vertical: these two links are then substantially in alignment with each other. The other links 5a and 5b which are hinged to respective ones of the half-risers 1a and 1b of the central riser 1, are in turn hinged to the base of said central interconnecting post 7 and are at an acute angle to each other.

When such a cart is to be collapsed, the user begins by unlocking the two half spheres 12a and 12b so as to fold the rod 10 along the half-riser 1b: the knuckle joint 12 is then locked in its new position. The user then releases the pressure on the central riser 1 by loosening the clamping screw 9, pivots the pressure plate 8 so that it takes up a position substantially perpendicular to that which it occupies when locking the riser 1, and retightens the clamping screw 9 so that the pressure plate 8 is locked against the hinge piece 2.

Figure 2:
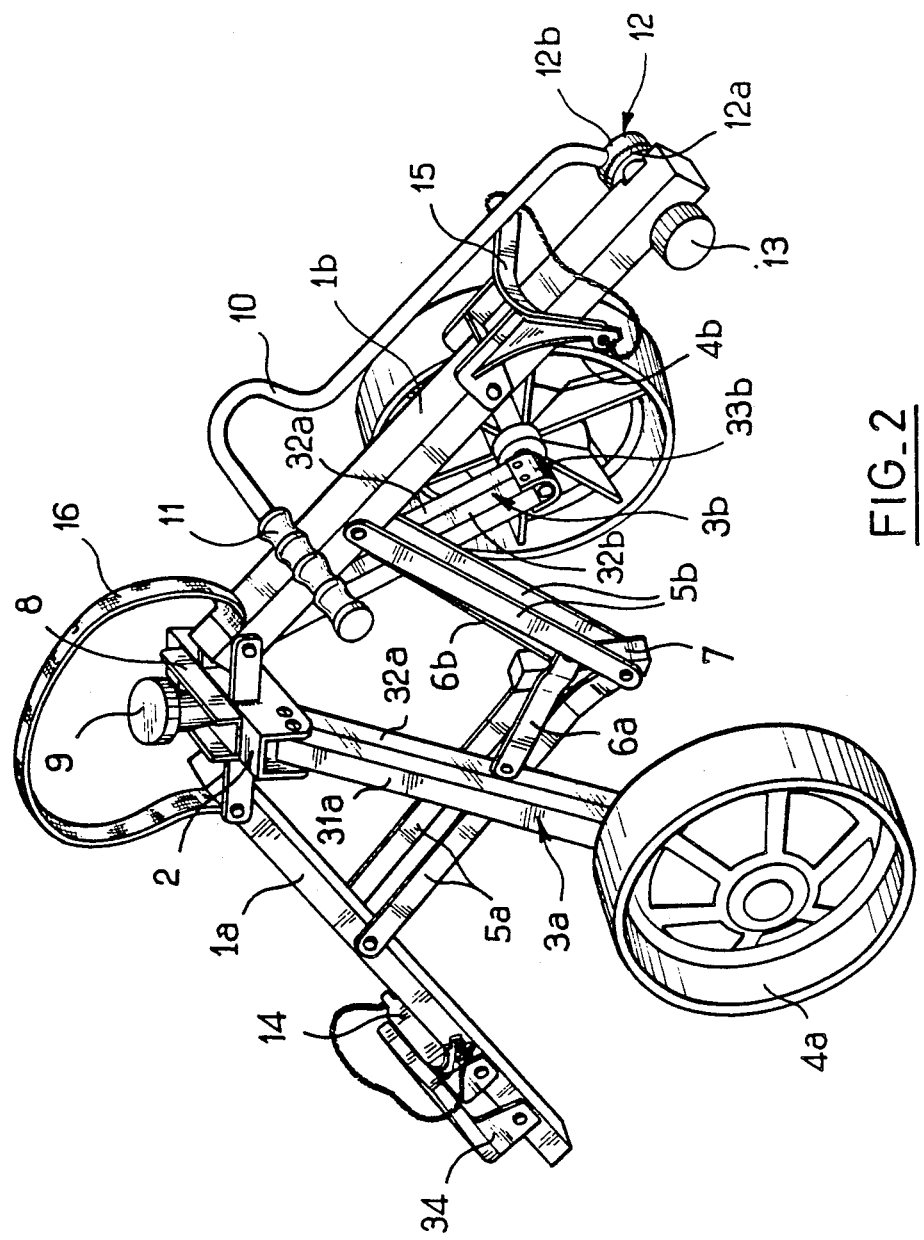
FIG. 2 is a perspective view of the same cart in an intermediate position, for example while being collapsed.

Then, by pressing simultaneously against both half-risers 1a and 1b constituting the central riser 1, the user not only causes these two half-risers to collapse, but also collapses the two side legs 3a and 3b by virtue of the action of the links 5a and 5b on the central interconnecting post 7. FIG. 2 shows an intermediate position of the carriage while it is being collapsed.

Figure 3:
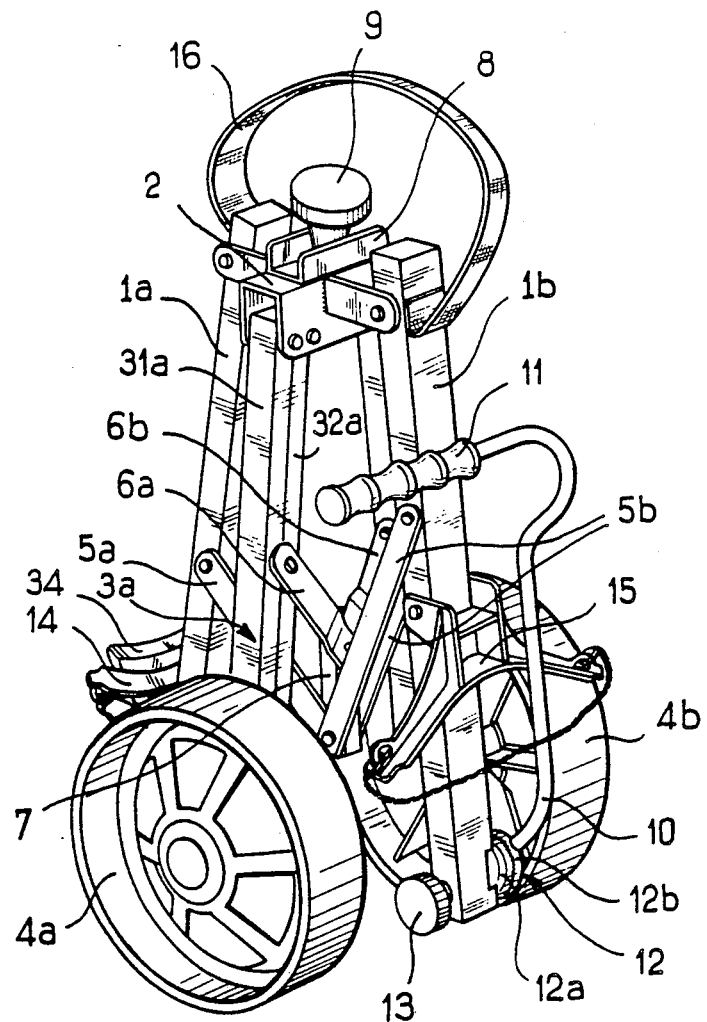
FIG. 3 is a perspective view of the same cart in its collapsed position.

Once they have been collapsed, the half-risers 1a and 1b and the side legs 3a and 3b are substantially parallel to one another and are all on the same side of the hinge piece 2, as can be seen in FIG. 3.

In order to make the collapsed cart easy to carry, it is advantageously provided with a handle-forming flexible strap 16 with each of its ends fixed to a corresponding half-riser of the central riser 1.

The collapsed cart is deployed in the opposite direction simply by returning the two-risers 1a and 1b to a position where they are in alignment with each other.

It is advantageous for each of the side legs 3a and 3b to be constituted by a pair of bars respectively 31a & 31b and 32a & 32b which are disposed one above the other, with only the bottom bars 32a and 32b being connected to the central interconnecting post 7 by the corresponding link 6a or 6b. These bars are parallel and each is hinged at each end either to the hinge piece 2 or to a bracket 33a or 33b serving to support the shaft of the associated wheel 4a or 4b (the bracket 33b is the only one visible in the drawings). Each assembly comprising a pair of bars associated with one wheel, together with those portions of the hinge piece 2 and the wheel shaft support that lie between the hinges constitutes a deformable parallelogam such that the shaft of each wheel 4a or 4b remains in a constant direction relative to the hinge part 2 during collapsing and deployment. This is important not only in the working position so as to ensure that both wheel shafts are horizontal, but also in the collapsed position in order to have an assembly which is compact in the sideways direction, and a subsidiary advantage lies in the cart standing properly on its wheels and the free ends of its half-risers.

The links 5a and 5b hinged to respective ones of the half-riserrs 1a and 1b are advantageously constituted by respective fork-constituting pairs of links.

As is will have been observed, such a cart is easy to operate. Further, in the collapsed position it is easy to carry and very compact. It may also be observed that the inclination of the central riser makes the cart easy to move when carrying a golf bag and it has relatively large ground clearance.

Finally, the hinged structure of the central riser ensures that jamming will not occur while the cart is being collapsed.

I claim:

1. A collapsible cart intended in particular for carrying a load such as a golf bag and clubs, the cart being capable of taking up a first, collapsed position in which it is compact, and a second, deployed position, the cart comprising:

a plurality of half-risers hinged together at adjacent ends to a common hinge piece such that in the deployed position said two half-risers are substantially in alignment and constitute an elongated, upwardly sloping, central riser, each of said half-risers including a load-fixing means for receiving a bag or the like extending along said deployed central riser, a lower one of said half-risers forming a strut having a lower free end adapted to stand on the ground;

a plurality of side legs each hinged at one end to said hinge piece and each having its other, free end provided with wheel means such that in the deployed position said side legs slope obliquely as does said central riser, with said lower free end of said strut and said wheels on said side legs forming a triangle on the ground;

a set of links connecting each half-riser and each side leg to a central interconnecting post such that in said collapsed position said side legs and said half-risers are substantially parallel to one another and all of them are situated on the same side of said hinge piece.

2. A collapsible cart according to claim 1, including locking means for locking the relative position of said half-risers to form said elongated central riser, said locking means being mounted on said hinge piece.

3. A collapsible cart according to claim 2, wherein said locking means comprises a pressure plate rotatable on a clamping screw so as to take up a first position corresponding to said collapsed position of said cart in which said pressure plate rests entirely against said hinge piece in order to leave said half-risers free to pivot, and a second position corresponding to said deployed position of said cart in which said pressure plate comes into contact with said adjacent ends of said half-risers while forming said central riser where said adjacent ends are hinged to said hinge piece.

4. A collapsible cart according to claim 1, wherein each of the side legs comprises a pair of bars disposed one above the other, with each bottom bar being connected to said central interconnecting post by a separate pivotally interconnectd link.

5. A collapsible cart according to claim 4, wherein said pair of bars of each side leg is hinged at one end to said hinge piece and at the other end to a support bracket associated with a shaft suporting said wheel means in such a manner as to ensure that said shafts of said wheel means remain aligned in the same direction.

6. A collapsible cart according to claim 1, wherein said central interconnecting post is substantially vertical when said cart is in said collapsed position.

7. A collapsible cart according to claim 1, wherein said links hinged to said side legs are connected to a top portion of said central interconnecting post so as to be substantially in alignment with each other in said deployed position.

8. A collapsible cart according to claim 1, wherein said links hinged to said central riser formed by said half-risers are hinged to a base portion of said central interconnecting post and are at an acute angle to each other.

9. A collapsible cart according to claim 1, wherein a free end of that one of said half-risers which does not constitute said strut, is hinged to a rod fitted with a handle.

10. A collapsible cart according to claim 9, wherein said rod fitted with a handle is hinged by means of a knuckle joint including locking means for securing said handle in a selectable relative angular position measured between said rod and the associated half-riser.

11. A collapsible cart according to claim 9, wherein said half-risers are of such a length that, when said cart is in said collapsed position, free ends of said half-risers are level with the edges of said wheels, thereby enabling the cart to stand securely in said collapsed position.

12. A collapsible cart according to claim 1, further including grasping means for facilitating handling said cart when in said collapsed position.

13. A collapsible cart according to claim 12, wherein the grasping means is essentially constituted by a handle-forming flexible strap having each of its ends fixed to a corresponding one of said half-risers of the central riser.

* * * * *